US009428181B2

(12) United States Patent
Matsui et al.

(10) Patent No.: US 9,428,181 B2
(45) Date of Patent: Aug. 30, 2016

(54) NEUTRAL DETERMINATION DEVICE AND VEHICLE CONTROL APPARATUS

(71) Applicant: Nissan Motor Co., Ltd., Yokohama-shi, Kanagawa (JP)

(72) Inventors: Hiroki Matsui, Ebina (JP); Haruhisa Tsuchikawa, Yokohama (JP); Katsuhiro Matsuo, Isehara (JP); Masami Suzuki, Mishima (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/416,067

(22) PCT Filed: Jul. 19, 2013

(86) PCT No.: PCT/JP2013/069616
§ 371 (c)(1),
(2) Date: Jan. 21, 2015

(87) PCT Pub. No.: WO2014/034319
PCT Pub. Date: Mar. 6, 2014

(65) Prior Publication Data
US 2015/0166055 A1    Jun. 18, 2015

(30) Foreign Application Priority Data
Aug. 31, 2012 (JP) .................................. 2012-190764

(51) Int. Cl.
*B60W 20/00*    (2016.01)
*B60W 30/184*   (2012.01)
(Continued)

(52) U.S. Cl.
CPC .................. *B60W 20/50* (2013.01); *B60K 6/48* (2013.01); *B60K 6/547* (2013.01); *B60W 10/02* (2013.01); *B60W 10/08* (2013.01); *B60W 10/10* (2013.01); *B60W 10/115* (2013.01); *B60W 20/00* (2013.01); *B60W 30/184* (2013.01); *B60W 2510/101* (2013.01); *B60W 2710/027* (2013.01); *B60W 2710/081* (2013.01); *B60Y 2300/429* (2013.01); *B60Y 2400/76* (2013.01); *F16H 63/46* (2013.01); *F16H 2059/147* (2013.01);
(Continued)

(58) Field of Classification Search
None
See application file for complete search history.

(56) References Cited

U.S. PATENT DOCUMENTS

2012/0109438 A1* 5/2012 Akebono ................. B60K 6/48
701/22

FOREIGN PATENT DOCUMENTS

| JP | 1-72211 A | 3/1989 |
| JP | 11-153217 A | 6/1999 |

(Continued)

*Primary Examiner* — Mussa A Shaawat
*Assistant Examiner* — Kyung Kim
(74) *Attorney, Agent, or Firm* — Global IP Counselors, LLP (57) ABSTRACT

A neutral determination device is provided with an inhibitor switch and a controller. The inhibitor switch outputs an inhibitor switch signal that indicates a vehicle running range of a vehicle. The controller is programmed to execute a neutral determination process upon determining the vehicle running range exists based on the inhibitor switch signal and a rotational speed control is being performed on a motor that is configured to output a force that drives the vehicle. The controller is programmed to determine existence of a neutral state of a control valve that is configured to selectively supply a control hydraulic pressure to a hydraulic pressure chamber of the clutch upon determining that a motor torque during the rotational speed control is smaller than an estimated motor torque based on a target transmission torque capacity of a clutch that selectively connects and disconnects the motor to and from a drive wheel.

5 Claims, 8 Drawing Sheets

(51) Int. Cl.
    *B60W 10/10*     (2012.01)
    *B60W 10/08*     (2006.01)
    *B60K 6/48*     (2007.10)
    *B60K 6/547*     (2007.10)
    *B60W 10/02*     (2006.01)
    *B60W 10/115*     (2012.01)
    *F16H 63/46*     (2006.01)
    *F16H 59/68*     (2006.01)
    *F16H 59/14*     (2006.01)

(52) U.S. Cl.
    CPC ... *F16H 2059/6823* (2013.01); *Y02T 10/6221* (2013.01); *Y10S 903/93* (2013.01)

(56) References Cited

FOREIGN PATENT DOCUMENTS

| | | |
|---|---|---|
| JP | 2000-234538 A | 8/2000 |
| JP | 2004-263741 A | 9/2004 |
| JP | 2004-347110 A | 12/2004 |
| JP | 2007-239959 A | 9/2007 |
| JP | 2009-222158 A | 10/2009 |
| JP | 2010-77981 A | 4/2010 |
| JP | 2012-91543 A | 5/2012 |
| JP | 2012-126271 A | 7/2012 |

\* cited by examiner

NEUTRAL DETERMINATION DEVICE AND VEHICLE CONTROL APPARATUS

CROSS-REFERENCE TO RELATED APPLICATIONS

This application is a U.S. National stage application of International Application No. PCT/JP2013/069616, filed Jul. 19, 2013, which claims priority to Japanese Patent Application No. 2012-190764 filed in Japan on Aug. 31, 2012.

BACKGROUND

1. Field of the Invention

The present invention relates to a neutral determination device and a vehicle control apparatus.

2. Background Information

Japanese Laid-Open Patent Application No. 2012-091543 discloses a technology for controlling a vehicle including a clutch that is disposed between a motor and a drive wheel, and that connects and disconnects them to and from each other based on an inhibitor switch signal.

SUMMARY

In a case where a selection lever is stop, for example, between the N-range position and the D-range position, an inhibitor switch signal may indicate that the selection lever is positioned in the D range in some cases. In such cases, when a manual valve has not switched from an N-range equivalent position to a D-range equivalent position, that is, when the manual valve is in a neutral state, no control hydraulic pressure can be supplied to a clutch hydraulic pressure chamber. In this state, when a driver depresses the accelerator, vehicle control corresponding to the D range, that is, vehicle control performed on the assumption that the control hydraulic pressure can be supplied to the clutch hydraulic pressure chamber is performed, resulting in a variety of problems. In the apparatus of related technology described above, there has therefore been a need to accurately determine that the manual valve (control valve) is in the neutral state when the inhibitor switch signal indicates that the selection lever is in the running range.

An object of the invention is to provide a neutral determination device capable of accurately determining that the control valve, which supplies the clutch with control hydraulic pressure, when the inhibitor switch signal indicates that the shift lever is in the running range, and to further provide a vehicle control apparatus.

To achieve the object described above, in the invention, when the inhibitor switch signal indicates that the shift lever is in the running range, the motor is controlled in terms of the rotational speed, and when the motor torque during the rotational speed control is smaller than estimated motor torque based on a target transmission clutch torque capacity, a determination is made that the selection lever is in the neutral state.

Since the target transmission clutch torque capacity is set at a torque capacity that allows transmission of the motor torque, when the motor torque is smaller than an estimated motor torque based on the target transmission clutch torque capacity, it can be estimated that no torque is transmitted to the rear wheels. Therefore, in the invention, when the inhibitor switch signal indicates that the shift lever is in the running range, it can be accurately determined that the control valve, which supplies the clutch with the control hydraulic pressure, is in the neutral state.

BRIEF DESCRIPTION OF THE DRAWINGS

Referring now to the attached drawings which form a part of this original disclosure.

DETAILED DESCRIPTION OF THE EMBODIMENTS

A vehicle control apparatus having a neutral determination device will be described based on the illustrated embodiment.

Figure 1:
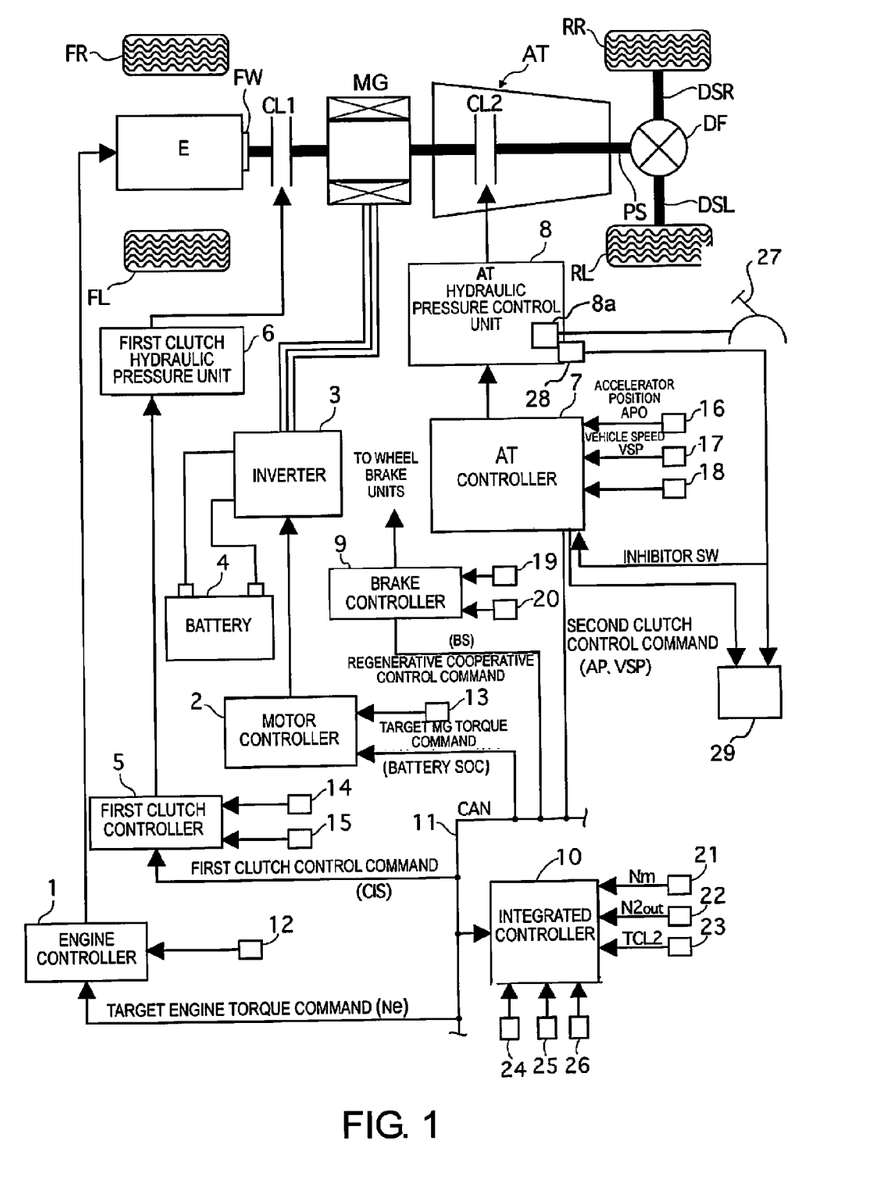
FIG. 1 is an overall system diagram showing a rear-wheel-driven hybrid vehicle according to in accordance with a first embodiment.

The configuration of a drive system of a hybrid vehicle will first be described. FIG. 1 is an overall system diagram showing a rear-wheel-driven hybrid vehicle using an engine starting control apparatus according to the first embodiment. The drive system of the hybrid vehicle in the first embodiment includes an engine E, a first clutch CL1, a motor generator MG, a second clutch CL2, an automatic transmission AT, a propeller shaft PS, a differential DF, a left drive shaft DSL, a right drive shaft DSR, a left rear wheel RL (drive wheel), and a right rear wheel RR (drive wheel), as shown in FIG. 1. Reference character FL denotes a left front wheel, and reference character FR denotes a right front wheel.

The engine E is, for example, a gasoline engine, and the valve position of a throttle valve and other parameters are controlled based on a control command from an engine controller 1, which will be described later. An engine output shaft is provided with a flywheel FW. The first clutch CL1 is a clutch interposed between the engine E and the motor generator MG, and control hydraulic pressure created by a first clutch hydraulic pressure unit 6 controls engagement and disengagement including slip engagement based on a control command from a first clutch controller 5, which will be described later.

The motor generator MG is a synchronous motor generator in which a permanent magnet is embedded in a rotor and a stator coil is wound around a stator and controlled by applied three-phase AC power generated by an inverter 3 based on a control command from a motor controller 2, which will be described later. The motor generator MG can operate as an electric motor that is rotatably driven when supplied with electric power from a battery 4 (this state is hereinafter referred to as "power running") or function as a generator that generates an electromotive force on both ends of the stator coil to charge the battery 4 when the rotor is rotated by an external force (this state is hereinafter referred to as "regeneration"). The rotor in the motor generator MG is connected to an input shaft of the automatic transmission AT via a damper that is not shown. The second clutch CL2 is a clutch interposed between the motor generator MG and the right and left rear wheels RR, RL, and control hydraulic pressure created by an AT hydraulic pressure control unit 8 controls engagement and disengagement including slip engagement based on an control command from an AT controller 7, which will be described later.

The automatic transmission AT is a transmission that automatically switches the change gear ratio having a limited number of shift positions, such as five forward speeds/one backward shift speed, in accordance with the vehicle speed, the accelerator position, and other factors, and the second clutch CL2 is not a newly added, dedicated clutch but is formed of some of a plurality of frictional engagement elements that engage with each other at each of the shift positions of the automatic transmission AT. The details of the second clutch CL2 will be described later. The output shaft of the automatic transmission AT is connected to the right and left rear wheels RR, RL via the propeller shaft PS as a vehicle drive shaft, the differential DF, the left drive shaft DSL, and the right drive shaft DSR. Each of the first clutch CL1 and the second clutch CL2 described above is formed, for example, of a multiplate wet clutch that allows a proportional solenoid to perform continuous control of the amount of hydraulic flow and the magnitude of hydraulic pressure.

The hybrid drive system has three running modes according to the state of engagement/disengagement of the first clutch CL1. A first running mode is an electric automobile running mode as a motor-based running mode in which the vehicle runs based only on the power from the motor generator MG as a power source with the first clutch CL1 disengaged (hereinafter abbreviated to "EV running mode"). A second running mode is an engine-based running mode in which the vehicle runs based primarily on the engine E as the power source with the first clutch CL1 engaged (hereinafter abbreviated to "HEY running mode"). A third running mode is an engine-based slip running mode in which the vehicle runs based primarily on the engine E as the power source with the first clutch CL1 engaged and the second clutch CL2 slip-controlled (hereinafter abbreviated to "WSC running mode"). This mode allows creep running particularly when the battery SOC is low or when the engine water temperature is low. To change the running mode from the EV running mode to the HEV running mode, the first clutch CL1 is engaged and the torque of the motor generator MG is used to start the engine.

Further, when the driver adjusts the accelerator pedal to perform accelerator hill hold that maintains the vehicle stopped, for example, on an uphill having a road surface slope greater than or equal to a predetermined value, an excessive amount of slip of the second clutch CL2 can be undesirably maintained in the WSC running mode. The reason for this is that the idle speed of the engine E cannot be reduced. To avoid the situation, in the first embodiment, a motor slip running mode is provided. In this mode, the engine E is maintained operating, the first clutch CL1 is disengaged, the second clutch CL2 is slip-controlled with the motor generator MG operating, and the vehicle runs based on the motor generator MG as the power source (hereinafter abbreviated to "MWSC running mode").

The "HEV running mode" described above includes three running modes, "engine running mode," "motor assisted running mode," and "running and generating mode." In the "engine running mode," only the engine E is used as the power source to drive the drive wheels. In the "motor assisted running mode," both the engine E and the motor generator MG are used as the power source to drive the drive wheels. In the "running and generating mode," the engine E is used as the power source to drive the drive wheels RR and RL and the motor generator MG is allowed to function as a generator. When the vehicle is driven at a constant speed or accelerated, the power from the engine E is used to operate the motor generator MG as a generator. On the other hand, when the vehicle is decelerated, braking energy is regenerated to allow the motor generator MG to generate power, and the generated power is used to charge the battery 4. Further, as another mode used when the vehicle is stopped, a power generation mode is provided. In this mode, the power from the engine E is used to allow the motor generator MG to operate as a generator.

A control system of the hybrid vehicle will next be described. The control system of the hybrid vehicle in the first embodiment includes the engine controller 1, the motor controller 2, the inverter 3, the battery 4, the first clutch controller 5, the first clutch hydraulic pressure unit 6, the AT controller 7, the AT hydraulic pressure control unit 8, a brake controller 9, and an integrated controller 10. The engine controller 1, the motor controller 2, the first clutch controller 5, the AT controller 7, the brake controller 9, and the integrated controller 10 are connected to each other via a CAN communication line 11, which allows information exchange among the components.

The engine controller 1 receives engine speed information as an input from an engine speed sensor 12 and outputs a command for controlling engine operation points (Ne: engine speed, Te: engine torque), for example, to a throttle valve actuator that is not shown in accordance, for example, with a target engine torque command from the integrated controller 10. The engine speed Ne and other types of information are supplied to the integrated controller 10 via the CAN communication line 11.

The motor controller 2 receives information as an input from a resolver 13, which detects the rotary position of the rotor in the motor generator MG and outputs a command for controlling motor operation points (Nm: motor speed, Tm:

motor torque) to the inverter 3 in accordance, for example, with a target motor torque command from the integrated controller 10. The motor controller 2 monitors the battery SOC representing the charged state of the battery 4, and the battery SOC information is used as information for controlling the motor generator MG and supplied to the integrated controller 10 via the CAN communication line 11.

The first clutch controller 5 receives sensor information as an input from a first clutch hydraulic pressure sensor 14 and a first clutch stroke sensor 15 and outputs a command for controlling the engagement and disengagement of the first clutch CL1 to the first clutch hydraulic pressure unit 6 in accordance with a first clutch control command from the integrated controller 10. Information on a first clutch stroke CIS is supplied to the integrated controller 10 via the CAN communication line 11.

The AT controller 7 receives an inhibitor switch signal as an input from an inhibitor switch 28, which outputs a range signal according to an accelerator position sensor 16, a vehicle speed sensor 17, a second clutch hydraulic pressure sensor 18, and the operation position of a selection lever 27 operated by the driver and outputs a command for controlling the engagement and disengagement of the second clutch CL2 to the AT hydraulic pressure control unit 8 in accordance with a second clutch control command from the integrated controller 10. The AT hydraulic pressure control unit 8 includes a manual valve (control valve) 8a, which cooperates with the selection lever 27. When the selection lever 27 is switched from the N-range position to the D-range (or R-range) position, the switching motion is transmitted to the manual valve 8a via a physical interlock mechanism and s spool position of the manual valve 8a is displaced from the N-range equivalent position, where the clutch initial pressure is not allowed to be transmitted to the hydraulic pressure chamber of the second clutch CL2, to the D-range equivalent position, where the clutch initial pressure is allowed to be transmitted to the hydraulic pressure chamber of the second clutch CL2, whereby the control hydraulic pressure can be supplied to the second clutch CL2. The accelerator pedal position APO, the vehicle speed VSP, and the inhibitor switch signal are supplied to the integrated controller 10 via the CAN communication line 11. Further, the inhibitor switch signal is transmitted to an in-meter display 29, which is provided in a combination meter (not shown) and displays the current range position.

The brake controller 9 receives sensor information as an input from a wheel speed sensor 19, which detects the wheel speed of each of the four wheels, and a brake stroke sensor 20 and performs regeneration cooperative brake control based on a regeneration cooperative control command from the integrated controller 10 in such a way that, for example, when the brake pedal is depressed for braking and only a regeneration braking force does not satisfy a braking force required from a brake stroke BS, a mechanical braking force (braking force produced by frictional brake) is added to achieve the required braking force.

The integrated controller 10 is responsible for a function of managing the amount of energy consumed by the entire vehicle and allowing the vehicle to run at maximum efficiency and receives not only information as an input from a motor speed sensor 21, which detects the motor speed Nm (motor-side speed of second clutch CL2 and hereinafter referred to as input rotational speed; the resolver 13 can instead be used), a second clutch output rotational speed sensor 22, which detects a second clutch output rotational speed N2out (drive-wheel-side speed of second clutch CL2 and hereinafter referred to as output rotational speed), a second clutch torque sensor 23, which detects a second clutch transmission torque capacity TCL2, a brake hydraulic pressure sensor 24, a temperature sensor 25, which senses the temperature of the second clutch CL2, and a G sensor 26, which detects longitudinal acceleration but also information obtained via the CAN communication line 11.

The integrated controller 10 performs control of the operation of the engine E by issuing a control command to the engine controller 1, control of the operation of the motor generator MG by issuing a control command to the motor controller 2, control of the engagement and disengagement of the first clutch CL1 by issuing a control command to the first clutch controller 5, and control of the engagement and disengagement of the second clutch CL2 by issuing a control command to the AT clutch controller 7.

Figure 2:
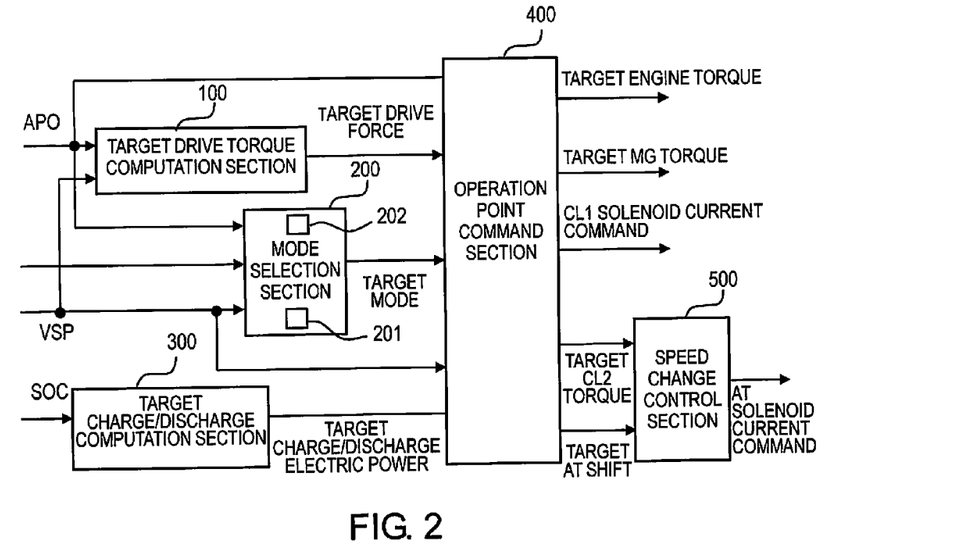
FIG. 2 is a control block diagram showing a computation processing program in an integrated controller in accordance with the first embodiment.

Control computed by the integrated controller 10 in the first embodiment will be described with reference to the block diagram shown in FIG. 2. For example, the computation is performed by the integrated controller 10 every control periods of 10 msec. The integrated controller 10 includes a target drive force computation section 100, a mode selection section 200, a target charge/discharge computation section 300, an operation point command section 400, and a speed change control section 500.

Figure 3:
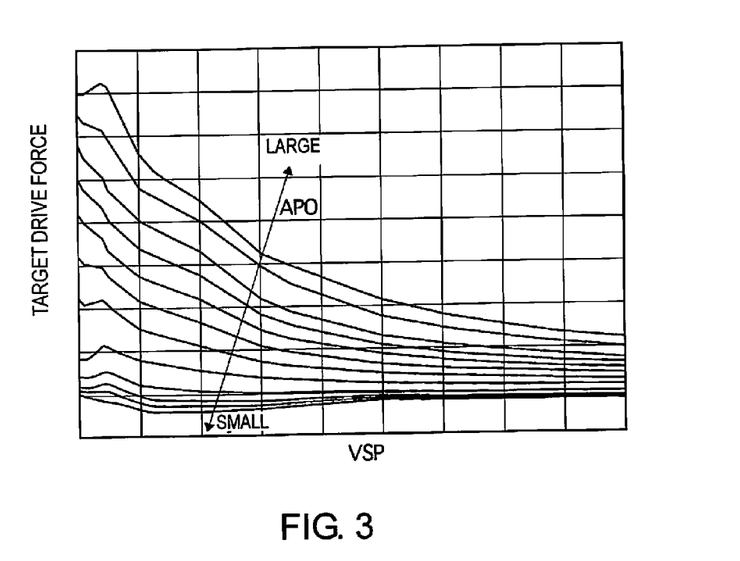
FIG. 3 is a graph showing an example of a target drive force map used in target drive force computation in a target drive force computation section in FIG. 2.

The target drive force computation section 100 uses a target drive torque map shown in FIG. 3 to compute a target drive torque tFoO based on the accelerator pedal position APO and the vehicle speed VSP. The mode selection section 200 includes a road surface slope estimation computation portion 201, which estimates a road surface slope based on a detected value from the G sensor 26. The road surface slope estimation computation portion 201 computes an actual acceleration from the average of acceleration values derived from the wheel speed from the wheel speed sensor 19 and other parameters and estimates a road surface slope from a difference between the computation result and the detected value from the G sensor.

Figure 4:
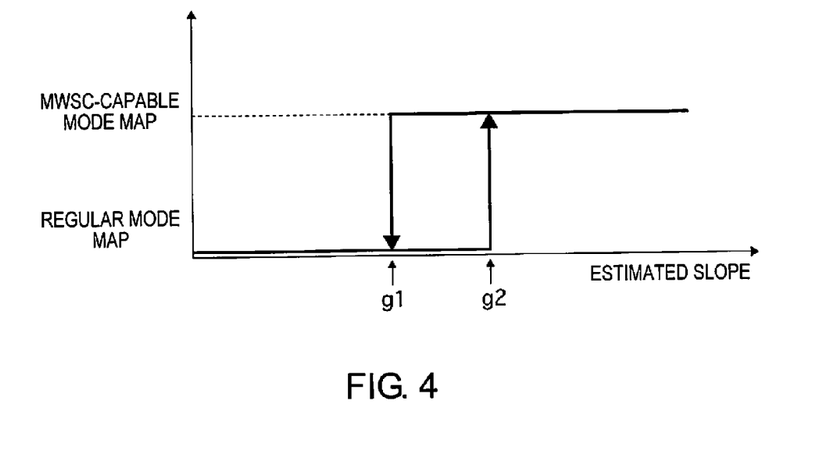
FIG. 4 is a view showing the relationship between mode maps selected by a mode selection section in FIG. 2 and an estimated slope.

The mode selection section 200 further includes a mode map selection portion 202, which selects one of two mode maps (described below) based on the estimated road surface slope. FIG. 4 schematically shows selection logic in accordance with which the mode map selection portion 202 operates. The mode map selection portion 202 switches the mode map from a regular mode map to an MWSC-capable mode map when the estimated slope is changed from a value in the state in which the regular mode map is selected to a value greater than or equal to a predetermined value g2. On the other hand, the mode map selection portion 202 switches the mode map from the MWSC-capable mode map to the regular mode map when the estimated slope is changed from a value in the state in which the MWSC-capable mode map is selected to a value smaller than a predetermined value g1 (<g2). That is, a hysteresis is provided in the estimated slope to prevent control hunting at the time of the map switching.

Figure 5:
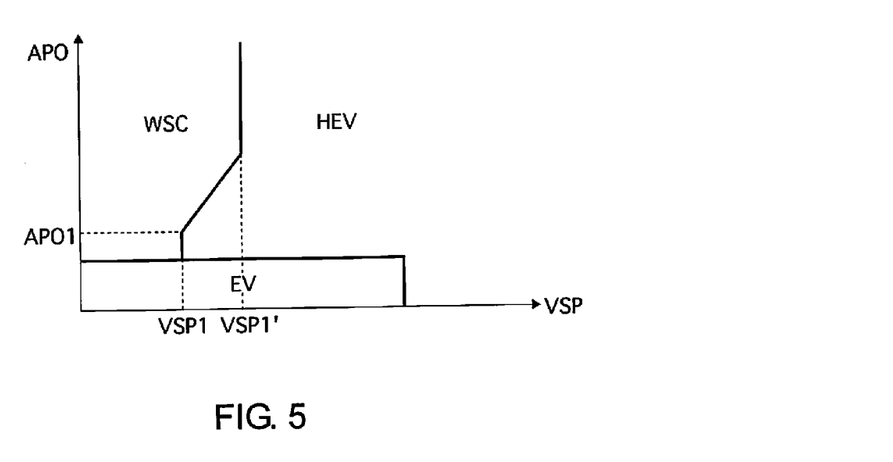
FIG. 5 is a view showing a regular mode map used to select a target mode in the mode selection section in FIG. 2.
Figure 6:
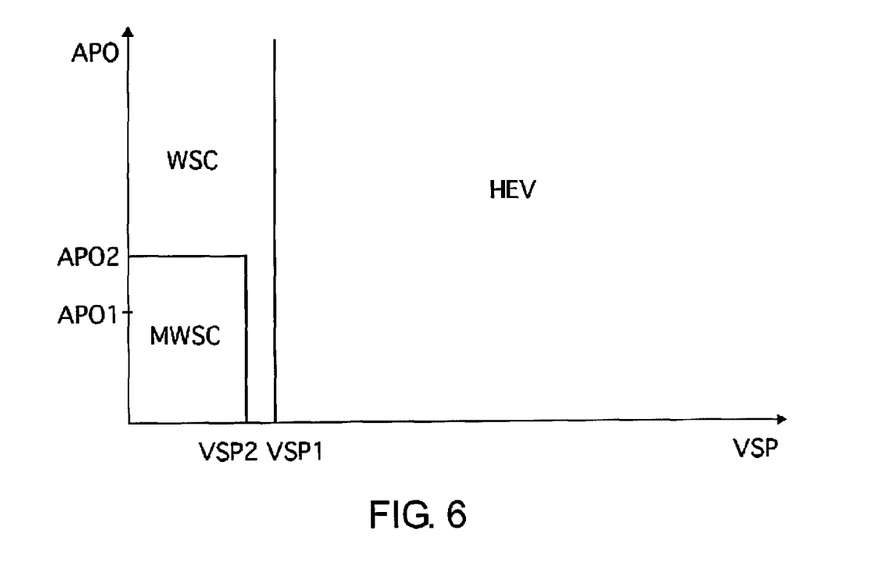
FIG. 6 is a view showing an MWSC-capable mode map used to select a target mode in the mode selection section in FIG. 2.

The mode maps will next be described. The mode maps include the regular mode map, which is selected when the estimated slope is smaller than a predetermined value, and the MWSC-capable mode map, which is selected when the estimated slope is greater than or equal to another predetermined value. FIG. 5 shows the regular mode map, and FIG. 6 shows the MWSC mode map. The regular mode map has areas corresponding to the EV running mode, the WSC running mode, and the HEV running mode, and a target mode is computed from the accelerator pedal position APO and the vehicle speed VSP. However, even when the EV running mode is selected, but the battery SOC is smaller than or equal to a predetermined value, the "HEV running mode" is forcibly set as the target mode.

In the regular mode map shown in FIG. 5, a line where HEV is switched to WSC in an area where the accelerator position is smaller than a predetermined value APO1 is set in an area where the vehicle speed is lower than a lower-limit vehicle speed VSP1, which corresponds to an engine speed lower than the idle speed of the engine E, when the automatic transmission AT is set at the first speed position. Further, in an area where the accelerator position is greater than or equal to the predetermined value APO1, where a large drive force is required, the area where the WSC running mode is set extends to an area where the vehicle speed is VSP1' higher than the lower-limit vehicle speed VSP1. When the battery SOC is low and the EV running mode cannot therefore be achieved, the WSC running mode is selected, for example, even at the start of the vehicle.

When a large accelerator pedal position APO is set, it is difficult to achieve the large accelerator pedal position APO with the torque of the engine and the torque of the motor generator MG that correspond to the engine speed close to the idle engine speed in some cases. It is noted that the output engine torque can be increased if the engine speed increases. Based on this fact, when the engine speed is increased so that the output torque is increased, the WSC running mode can be quickly changed to the HEV running mode even when the vehicle is operated in the WSC running mode from the lower-limit vehicle speed VSP1 to a higher vehicle speed. This case corresponds to the WSC area extended to the lower-limit vehicle speed VSP1' shown in FIG. 5.

The MWSC mode map differs from the regular mode map in that no EV running mode area is set. The MWSC mode map further differs from the regular mode map in that the WSC running mode area is not changed in accordance with the accelerator pedal position APO but is defined only by the lower-limit vehicle speed VSP1. The MWSC mode map still further differs from the regular mode map in that an MWSC running mode area is set in the WSC running mode area. The MWSC running mode area is set in an area surrounded by a predetermined vehicle speed VSP2, which is lower than the lower-limit vehicle speed VSP1, and a predetermined accelerator position APO2, which is higher than the predetermined accelerator position APO1. The MWSC running mode is a running mode in which the first clutch CL1 is disengaged with the engine E operating to control the motor generator MG in terms of rotational speed and the second clutch CL2 is slip-controlled. As compared with the WSC running mode, the MWSC running mode allows reduction in the amount of slip by setting a low input rotational speed of the second clutch CL2.

Figure 7:
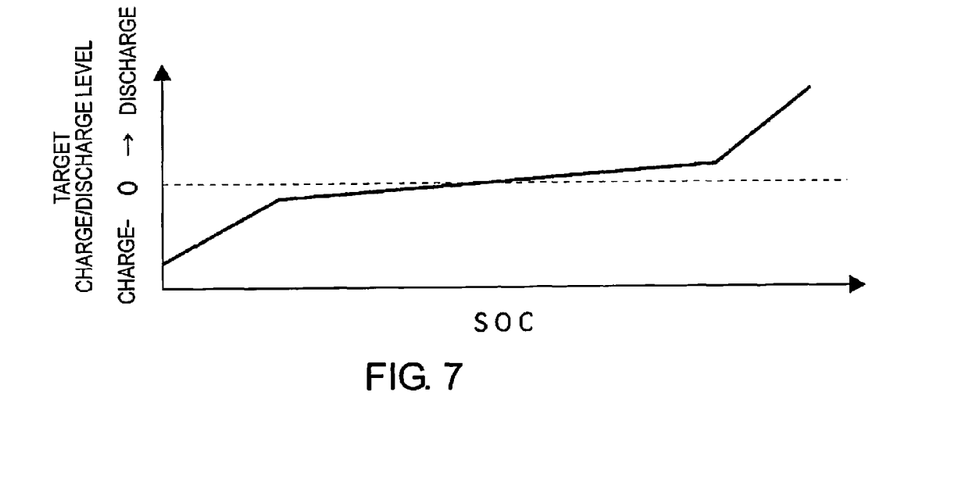
FIG. 7 is a view showing an example of a target charge/discharge level map used in computation of target charge/discharge electric power in a target charge/discharge computation section in FIG. 2.

The target charge/discharge computation section 300 uses a target charge/discharge level map shown in FIG. 7 to compute target charge/discharge electric power tP from the battery SOC. The operation point command section 400 uses the accelerator pedal position APO, the target drive torque tFoO, the target mode, the vehicle speed VSP, and the target charge/discharge electric power tP to compute a transient target engine torque, a target motor torque, a target second clutch transmission torque capacity, a target speed change position of the automatic transmission AT, and a first clutch solenoid current command as targets of the operation points described above.

Further, the operation point command section 400 is provided with an engine start control portion that starts the engine E when the running mode is changed from the EV running mode to the HEV running mode. The engine start control portion allows the second clutch CL2 to operate in a slip control state by setting a second clutch transmission torque capacity according to the target drive torque and controls the motor generator MG in terms of rotational speed so that a target motor speed is set at a drive wheel speed equivalent value to which a predetermined amount of slip is added. In this state, the first clutch CL1 is caused to produce a clutch transmission torque capacity to start the engine. As a result, the output shaft torque is stabilized by the clutch transmission torque capacity of the second clutch CL2, and even when the motor speed decreases due to the engagement of the first clutch CL1, the motor torque increases by the rotational speed control, whereby the engine can be reliably started. The speed change control section 500 controls and drives a solenoid valve in the automatic transmission AT in such a way that the target second clutch transmission torque capacity and the target speed change position are achieved along a shift schedule shown in a shift map. In the shift map, target speed change positions are set in advance based on the vehicle speed VSP and the accelerator pedal position APO.

Figure 8:
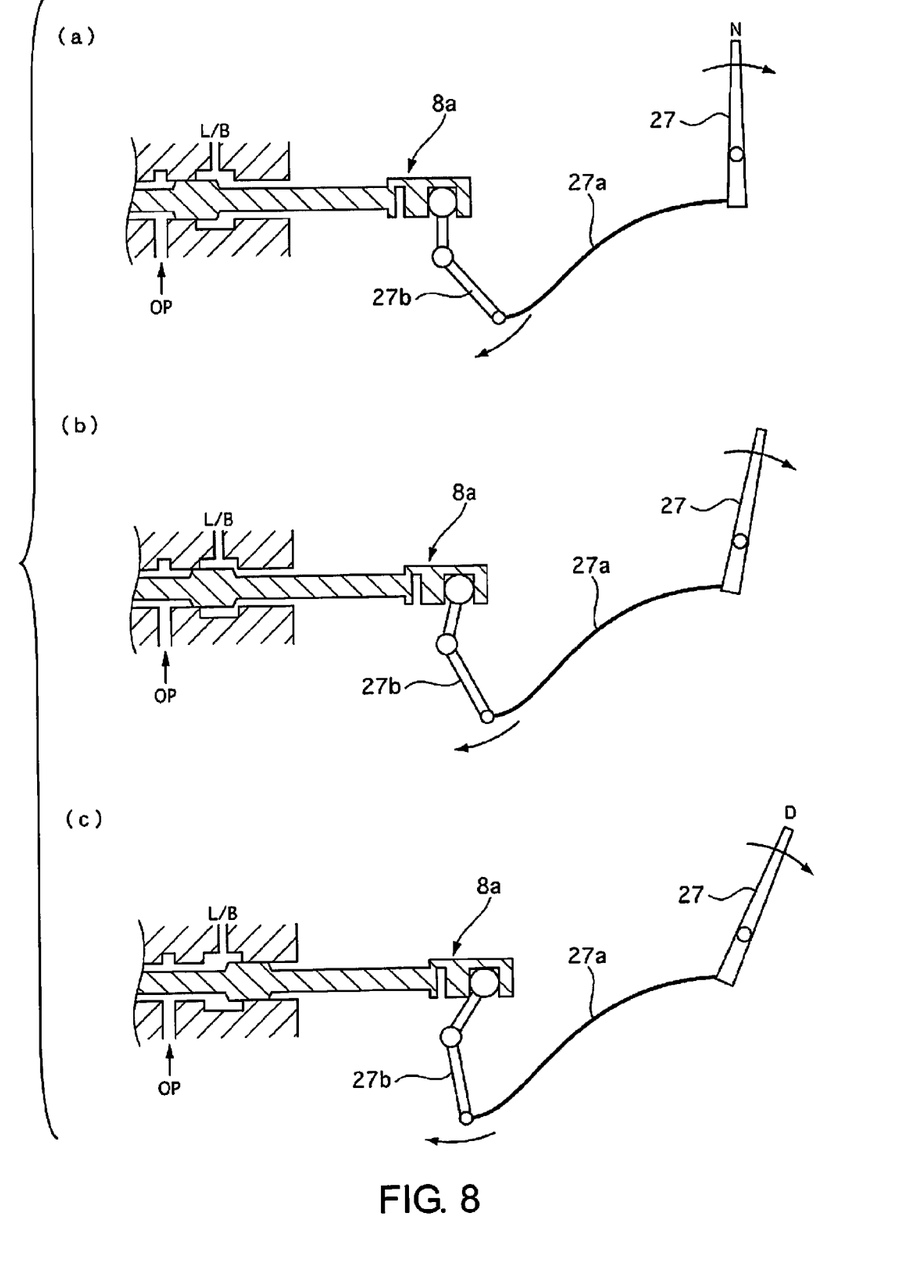
FIG. 8 is a sequential diagram of views showing the relationship between an inhibitor switch signal and a manual valve in a case where a selection lever is operated from an N-range position to a D-range position.

Neutral Determination at the Time of Selection Lever Stopped in Intermediate Position The manual valve 8a is mechanically connected to the selection lever 27 via a select cable 27a and an AT-side linkage 27b, as shown in FIG. 8, and when the spool travels in accordance with the position to which the selection lever 27 is operated, each hydraulic path is set in accordance with the range position. The inhibitor switch 28 detects the position of the selection lever 27 based on the angle of the AT-side linkage 27b and outputs a corresponding inhibitor switch signal. When the selection lever 27 is in the N-range position as shown in FIG. 8(a), the inhibitor switch signal indicates that the selection lever 27 is in the N range. At this point, the spool position of the manual valve 8a is in the N-range-equivalent position where the communication between a hydraulic pump OP and a low brake L/B (corresponding to second clutch CL2 at the time of vehicle start) is blocked, and the automatic transmission AT (manual valve 8a) is in the neutral state. When the selection lever 27 is initiated to move from the N-range position to the D-range position, the inhibitor switch signal is switched from N to D before the spool position of the manual valve 8a is changed to the D-range-equivalent position (FIG. 8(b)). Thereafter, when the selection lever 27 is moved to the D-range position, the spool position of the manual valve 8a is in the D-range-equivalent position where the hydraulic pump OP and the low brake L/B communicates with each other, whereby the control hydraulic pressure can be supplied from the hydraulic pump OP to the low brake L/B (FIG. 8(c)).

In the state shown in FIG. 8(b), that is, in an event such as when the selection lever 27 is stopped in an intermediate position between the N-range position and the D-range position, the inhibitor switch signal indicates that the selection lever 27 is in the D range, but the automatic transmission AT is still in the neutral state. At this point, since the hydraulic pump OP and the low brake L/B do not communicate with each other, no control hydraulic pressure can be supplied to the low brake L/B. If the driver depresses the accelerator pedal in this state, the vehicle control corresponding to the D range, that is, vehicle control assuming a state in which control hydraulic pressure can be supplied to the second clutch CL2 is performed, resulting in the following variety of problems:

When the accelerator pedal is depressed, the rotation of the engine E or the motor generator MG is sped up.

In a case where the driver does not depress the brake pedal but slowly switches the N range to the D range in the EV running mode, when a creep torque is produced in the WSC running mode, the rotation is temporarily sped up, followed by a shock due to abrupt engagement of the second clutch CL2 when it becomes engageable. Although the in-meter display 29 displays the D range, the vehicle does not move forward and the driver therefore thinks that something is wrong.

To address the problems described above, the integrated controller 10 performs the following neutral determination control process in order to accurately determine that the automatic transmission AT is in the neutral state when the inhibitor switch shows that the selection lever is in the D range and solve the problems described above.

Neutral Determination Control Process

Figure 9:
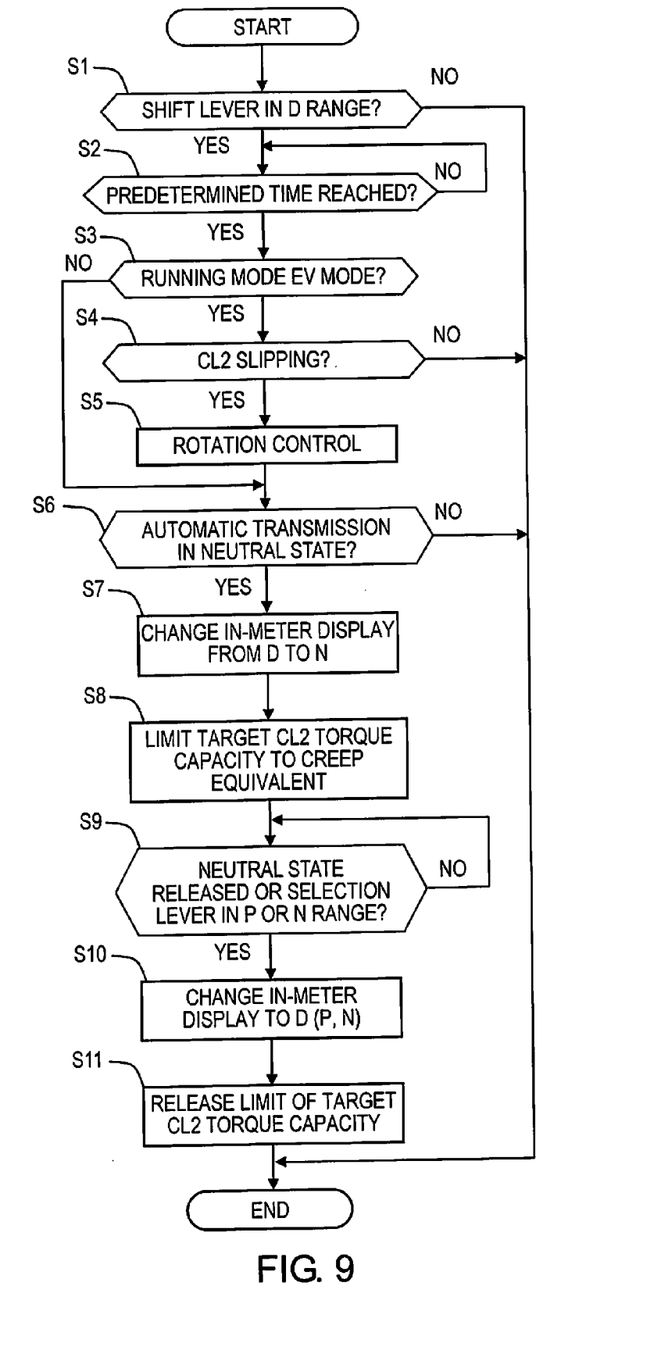
FIG. 9 is a flowchart showing the procedure of a neutral determination control process carried out by the integrated controller.

FIG. 9 is a flowchart showing the procedure of the neutral determination control process carried out by the integrated controller 10. Each step in the flowchart will be described below.

In step S1, a determination is made as to whether or not the inhibitor switch signal indicates that the selection lever is in the D range. When the determination result is YES, the control proceeds to step S2, whereas when the determination result is NO, the procedure is terminated.

In step S2, a determination is made as to whether or not a predetermined time has been reached after the determination of YES in step S1. When the determination result is YES, the control proceeds to step S3, whereas when the determination result is NO, the step S2 is repeated. The predetermined time is assumed to be expected time when the motor torque or the motor speed reaches a target value after the second clutch CL2 undergoes backlash elimination since the time when the inhibitor switch signal indicates that the selection lever is in the D range.

In step S3, a determination is made as to whether the running mode is either the EV running mode or the WSC running mode. When the determination result shows that the running mode is the EV running mode, the control proceeds to step S4, whereas when the determination result shows that the running mode is the WSC running mode, the control proceeds to step S6.

In step S4, a determination is made as to whether or not the second clutch CL2 is slipping. When the determination result is YES, the control proceeds to step S5, whereas when the determination result is NO, the procedure is terminated. In this description, when a value obtained by subtracting the output rotational speed (second clutch output rotational speed) from the input rotational speed (motor speed) is greater than or equal to a predetermined threshold, a determination is made that the second clutch CL2 is slipping. The threshold only needs to be greater than zero and is determined in consideration of sensor precision.

In step S5, the motor generator MG is so controlled in terms of rotational speed that a predetermined rotational speed is achieved, and the second clutch transmission torque capacity is set at torque capacity according to a target drive force.

In step S6, a determination is made as to whether or not the automatic transmission AT is in the neutral state. When the determination result is YES, the control proceeds to step S7, whereas when the determination result is NO, the procedure is terminated. The determination of the neutral state in the EV running mode differs that in the WSC running mode.

1. EV Running Mode

A determination is made that the automatic transmission AT is in the neutral state when the following Expression (1) is satisfied:

$$Tm \leq TTCL2 + Fat + I\omega - \alpha \quad (1)$$

where Tm represents the motor torque, TTCL2 represents a torque equivalent to the target second clutch transmission torque capacity, Fat represents friction of the automatic transmission AT, friction of the motor generator MG, and the amount of drag of the first clutch CL1, $I\omega$ represents the inertia of the motor generator MG, and α represents the amount of variation in the torque of the second clutch CL2.

Figure 10:
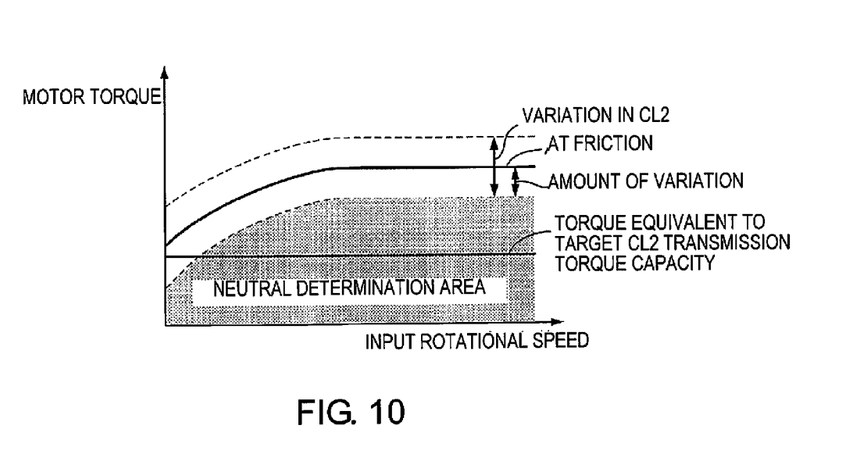
FIG. 10 is a view showing the relationship among a neutral determination area, a torque equivalent to a target second clutch transmission torque capacity, the friction of the automatic transmission AT, and the amount of variation in the torque of the second clutch.

The right hand of Expression (1) represents an estimated lower limit of the motor torque based on the target second clutch transmission torque capacity. Therefore, when Expression (1) is satisfied, it can be estimated that the automatic transmission AT is in the neutral state. FIG. 10 shows the relationship among the neutral determination area, the torque equivalent to the target second clutch transmission torque capacity, the friction of the automatic transmission AT, and the amount of variation in the torque of the second clutch CL2. It is noted that the friction Fat may be set in consideration of temperature.

2. WSC Running Mode

A determination is made that the automatic transmission AT is in the neutral state when the following Expression (2) is satisfied:

$$Tm \leq TTCL2 + Fat + I\omega - \alpha - \beta - \text{engine torque command value} \quad (2)$$

where Tm represents the motor torque, TTCL2 represents a torque equivalent to the target second clutch transmission torque capacity, Fat represents friction of the automatic transmission AT, the engine E, and the motor generator MG, $I\omega$ represents the inertia of the motor generator MG, the engine E, and the first clutch CL1 (upstream of second clutch CL2), α represents the amount of variation in torque of the second clutch CL2, and β represents variation in the engine torque.

Figure 11:
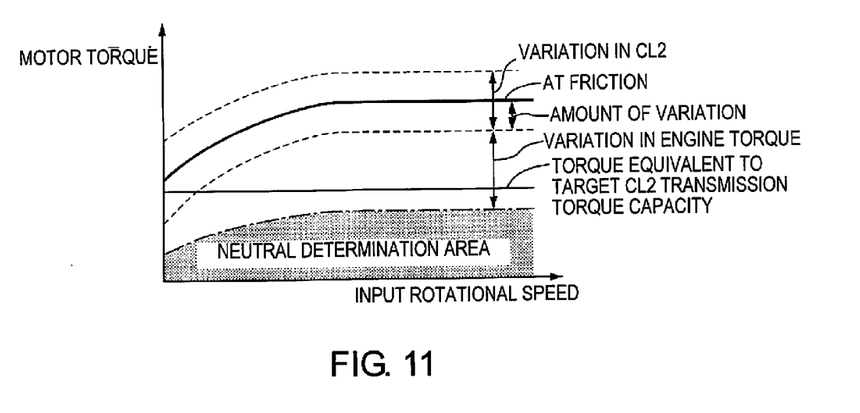
FIG. 11 is a view showing the relationship among the neutral determination area, the torque equivalent to the target second clutch transmission torque capacity, the friction of the automatic transmission AT, the amount of variation in the torque of the second clutch, and variation in an engine torque.

The right side of Expression (2) represents an estimated lower limit of the motor torque based on the target second clutch transmission torque capacity. Therefore, when Expression (2) is satisfied, it can be estimated that the automatic transmission AT is in the neutral state. FIG. 11 shows the relationship among the neutral determination area, the torque equivalent to the target second clutch transmission torque capacity, the friction of the automatic transmission AT, the amount of variation in the torque of the second clutch CL2, and variation in the engine torque. Step S6 corresponds to neutral determination means.

In step S7, the range display in the in-meter display 29 is changed from the D range to the N range.

In step S8, the second clutch transmission torque capacity is limited to a torque capacity according to a creep torque equivalent. The creep torque equivalent is a torque smaller than a creep torque and a value in consideration of suppression of the shock produced by the second clutch CL2 when it is engaged and provision of the drive force.

In step S9, a determination is made as to whether or not the neutral state of the automatic transmission AT has been released or whether or not the inhibitor switch signal indicates that the selection lever is in the P or N range. When one of the determination results is YES, the control proceeds to step S10, whereas when one of the determination results is NO, step S9 is repeated.

In step S10, the range display in the in-meter display 29 is changed to D, P, or N. When the determination result in step S9 shows that the neutral state has been released, the display is changed to D. When the inhibitor switch signal indicates that the selection lever is in the P or N range, the display is changed to P or N.

In step S11, the limit of the second clutch transmission torque capacity is released, and the procedure is terminated. At this point, to suppress abrupt engagement of the second clutch CL2, ramp control in which the second clutch transmission torque capacity is gradually increased to a target second clutch transmission torque capacity according to the running mode may be performed.

Figure 12:
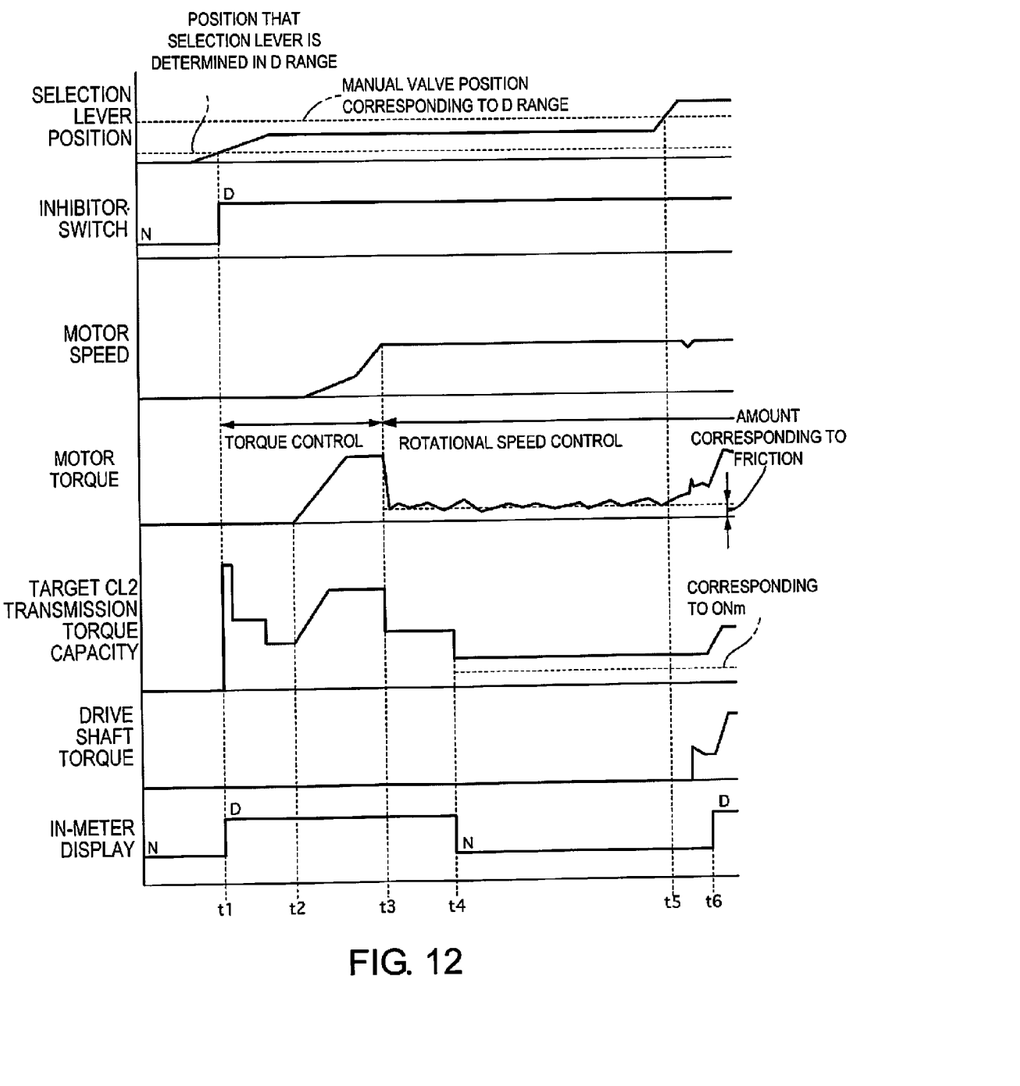
FIG. 12 is a time chart showing a neutral determination effect in accordance with the first embodiment.

Advantageous effects will next be described. FIG. 12 is a time chart showing a neutral determination effect in the first embodiment. In the time chart, it is assumed that the vehicle is stopped.

At time t1, since the selection lever 27 reaches the position where the inhibitor switch 28 determines that the selection lever 27 is in the D range, the inhibitor switch signal is switched from a signal showing that the selection lever is in the N range to a signal showing that the selection lever is in the D range. At this point, the EV running mode is selected as the running mode based on the vehicle speed (=0) and the accelerator position, the second clutch CL2 starts undergoing the backlash elimination, and the range display in the in-meter display 29 is switched from the N range to the D range.

At time t2, since the backlash elimination has been completed, the motor generator MG is so controlled in terms of torque that a creep torque is achieved, and the second clutch transmission torque capacity is set at a torque capacity according to "target drive force+predetermined margin." As a result, the motor speed and the motor torque start increasing. Since the selection lever 27 is stopped in an intermediate position between the N-range position and the D-range position before the time t2 is reached, the manual valve 8a has not been switched from the N-range-equivalent position to the D-range-equivalent position, and the automatic transmission AT is in the neutral state.

At time t3, after a determination is made that the second clutch CL2 is slipping, the torque control is switched to the rotational speed control so that the motor speed is controlled to be constant, and the second clutch transmission torque capacity is set at a torque capacity of a creep torque apparatus. Since the motor speed is held to be constant, the motor torque has a value that handles a load corresponding to the amount of friction.

At time t4, a determination is made that the automatic transmission is in the neutral state, the range display in the in-meter display 29 is changed from the D range to the N range, and the second clutch transmission torque capacity is limited to a torque capacity according to the creep torque.

At time t5, the driver operates the selection lever 27 to switch the manual valve 8a from the N-range-equivalent position to the D-range-equivalent position so that the neutral state of the automatic transmission AT is released, whereby the drive shaft torque starts increasing.

At time t6, after a determination is made that the neutral state is released, the range display in the in-meter display 29 is changed from the N range to the D range, and the limit of the second clutch transmission torque capacity is released. As a result, the target second clutch transmission torque capacity increases to a torque capacity according to the target drive force, whereby the vehicle can be started.

Neutral Determination Effect

In the first embodiment, when the inhibitor switch signal indicates that the selection lever is in the D range, the motor generator MG is controlled in terms of rotational speed, and when the motor torque during the rotational speed control is smaller than estimated motor torque based on a target second clutch transmission torque capacity, a determination is made that the automatic transmission AT is in the neutral state. That is, since the neutral determination is made with the motor generator MG so controlled in terms of rotational speed that the motor speed has a predetermined value, the motor rotation or the engine rotation will not be sped up even when the driver depresses the accelerator pedal.

Since the motor generator MG is controlled in terms of rotational speed, depending on whether or not the actual motor torque is smaller than the estimated motor torque based on the target second clutch transmission torque capacity, it can be estimated that no torque is transmitted to the rear wheels RR and RL, whereby the neutral state of the automatic transmission AT can be quickly and accurately determined. For example, when the neutral determination is made based only on the difference in rotational speed between the input and the output to and from the second clutch, it is necessary to set a rotation margin in consideration of the accuracy of the rotation sensor to avoid wrong determination, which requires time before the neutral state determination is made, resulting in an increase in the amount of racing of the motor rotation or engine rotation. If the amount of racing is large, a large amount of shock occurs when the second clutch is engaged. Further, when logic in accordance with which a determination is made that failure has occurred when the input rotational speed is greater than or equal to a specified value is employed, the determination is made with the rotational speed racing and failure control is then performed, causing the driver to feel anxiety. Moreover, when the second clutch is slip-controlled during the rotational speed control at the time of vehicle start as in the WSC running mode shown in the first embodiment, in which the control is so performed that the difference in rotational speed between the input and the output is maintained, the neutral state cannot be determined based only on the difference in the rotational speed. In contrast, in the first embodiment, since the neutral state is determined based on the difference in torque (deviation of motor torque from estimated motor torque), the neutral state can be accurately determined and the time required to make the determination can be shortened. As a result, the amount of racing can be reduced until the determination is completed, and transition to failure control will not occur.

Further, when the inhibitor switch signal indicates that the selection lever is in the D range, the motor generator MG is controlled in terms of torque, and when the input rotational speed (motor speed) exceeds the output rotational speed (second clutch output rotational speed) during the torque control, the rotational speed control on the motor generator MG is initiated, and the neutral state determination is made. That is, the difference in the rotational speed between the input and the output is first monitored in the torque control to ascertain that loss of power transmitted to the rear wheels RR and RL has occurred, and final neutral determination is then made based on the rotational speed control, whereby the neutral state can be more accurately determined. Since no rotation margin in consideration of the accuracy of the rotation sensor is set in the determination based on the difference in the rotational speed between the input and the output, the determination period can be shortened as compared with a case where the neutral determination is made based only on the difference in the rotational speed between the input and the output to and from the second clutch.

CL2 Torque Capacity Limiting Effect in Neutral Determination

In the first embodiment, when the inhibitor switch shows that the selection lever is in the D range and a determination is made that the automatic transmission AT is in the neutral state, the second clutch transmission torque capacity is limited to a torque capacity according to a creep torque equivalent. For example, when the second clutch transmission torque capacity is not limited, and the manual valve 8a is switched from the N-range-equivalent position to the D-range-equivalent position, a shock occurs when the second clutch is abruptly engaged. On the other hand, when the second clutch transmission torque capacity is set at zero, and the manual valve 8a is switched from the N-range-equivalent position to the D-range-equivalent position, no torque is transmitted until the second clutch transmission torque capacity starts increasing, resulting in no drive force provided. Limiting the second clutch transmission torque capacity to a creep torque equivalent therefore allows suppression of the engagement shock and provision of the drive force.

In-Meter Display Change Effect in Neutral Determination

In the first embodiment, when the inhibitor switch shows that the selection lever is in the D range and a determination is made that the automatic transmission AT is in the neutral state, the range display in the in-meter display 29 is changed from the D range to the N range. If the vehicle does not move forward although the in-meter display displays the D range, the driver feels uncomfortable. In contrast, changing the display from the D range to the N range allows the degree of the uncomfortable sensation felt by the driver to be reduced and prompts the driver to operate the selection lever 27 to move it form an intermediate position.

In the first embodiment, the advantageous effects listed below are provided:

(1) When the inhibitor switch signal indicates that the selection lever is in the D range, the motor generator MG is controlled in terms of rotational speed, and when the motor torque during the rotational speed control is smaller than an estimated motor torque based on a target transmission torque capacity of the second clutch CL2, which is interposed between the motor generator MG and the rear wheels RR/RL and connects and disconnects them to and from each other, a determination is made that the automatic transmission AT is in the neutral state. Therefore, when the inhibitor switch signal indicates that the selection lever is in the D range, it can be accurately determined that the automatic transmission AT is in the neutral state. Further, the amount of racing of the rotational speed can be reduced when the driver depresses the accelerator pedal during the determination.

(2) When the inhibitor switch signal indicates that the selection lever is in the D range, the motor generator MG is controlled in terms of torque, and when the input rotational speed (motor speed) is greater than the output rotational speed (second clutch output rotational speed) during the torque control, the rotational speed control on the motor generator MG is initiated and the neutral state is determined. The neutral state can therefore be more accurately determined.

(3) When the neutral determination means (S6) has determined that the automatic transmission is in the neutral state, the second clutch transmission torque capacity is limited (S8). Suppression of the engagement shock and provision of the drive force can therefore be achieved.

(4) When the neutral determination means (S6) has determined that the automatic transmission is in the neutral state, the range position in the in-meter display 29, which provides a passenger with information, is changed from the D range to the N range. The range position switching allows the degree of the uncomfortable sensation felt by the driver to be reduced and prompts the driver to operate the selection lever 27 to move it form an intermediate position.

Other Embodiments

The invention has been described with reference to an embodiment, and the specific configurations may be other configurations. For example, the embodiment has been described with reference to an FR-type hybrid vehicle, but the invention is also applicable to an FF-type hybrid vehicle. Further, the embodiment has been described with reference to a hybrid vehicle including an engine and a motor generator, but the invention is also applicable to an electric automobile including only a motor as the power source, and the same advantageous effects as those provided by the embodiment can be provided. Moreover, in the first embodiment, by way of example, the case where the neutral determination is made in the EV running mode and the WSC running mode is presented. The invention is, as shall be apparent, applicable to the MWSC running mode. Further, a transmission having a limited number of shift positions is presented by way of example; a continuously variable transmission may also be used.

The invention claimed is:

1. A neutral determination device comprising:
an inhibitor switch configured to output an inhibitor switch signal that indicates a vehicle running range of a vehicle; and
a controller programmed to execute a neutral determination process upon determining the vehicle running range exists based on the inhibitor switch signal and a rotational speed control is being performed on a motor that is configured to output a force that drives the vehicle, and
the controller being further programmed to determine existence of a neutral state of a control valve that is configured to selectively supply a control hydraulic pressure to a hydraulic pressure chamber of the clutch upon determining that a motor torque during the rotational speed control is smaller than an estimated motor torque based on a target transmission torque capacity of a clutch that selectively connects and disconnects the motor to and from a drive wheel.

2. The neutral determination device as claimed in claim 1, wherein
the controller is further programmed to execute the neutral determination process upon determining that the vehicle running range exists based on the inhibitor switch signal and a torque control is being performed on the motor, and
the controller is further programmed to control of the speed of the motor and to determine existence of the neutral state of the control valve upon determining that a motor-side rotational speed of the clutch becomes higher than a drive-wheel-side rotational speed of the clutch during the torque control.

3. A vehicle controlling apparatus comprising:

a motor configured to output a force to a drive wheel of a vehicle;

a clutch selectively connecting and disconnecting the motor to and from the drive wheel;

a control valve configured to selectively supply a control hydraulic pressure to a hydraulic pressure chamber of the clutch with control hydraulic pressure;

an inhibitor switch configured to output an inhibitor switch signal that indicates vehicle running range of a vehicle;

a controller programmed to execute a neutral determination process upon determining the vehicle running range exists based on the inhibitor switch signal and a rotational speed control is being performed on the motor, and the controller being further programmed to determine existence of the neutral state of the control valve upon determining that a motor torque during the rotational speed control is smaller than an estimated motor torque based on a target transmission torque capacity of a clutch that is interposed between the motor and a drive wheel and that selectively connects and disconnects the motor to and from the drive wheel;

the controller being further programmed to limit a transmission torque capacity of the clutch upon determining existence of the neutral state of the control valve.

4. The vehicle controlling apparatus as claimed in claim 3, further comprising an in-meter display configured to provide a passenger with information of a range position of the control valve, the in-meter display being switched from a running range to a neutral range, upon the controller determining that the control valve is in the neutral state.

5. The vehicle controlling apparatus as claimed in claim 3, wherein the controller is further programmed to execute the neutral determination process upon determining that the vehicle running range exists based on the inhibitor switch signal and a torque control is being performed on the motor, and the controller is further programmed to control of the speed of the motor and to determine existence of the neutral state of the control valve upon determining that a motor-side rotational speed of the clutch becomes higher than a drive-wheel-side rotational speed of the clutch during the torque control.

* * * * *